United States Patent [19]
Gorr

[11] Patent Number: 4,457,267
[45] Date of Patent: Jul. 3, 1984

[54] KINETIC ENERGY INJECTOR—METHOD AND APPARATUS FOR IMPROVING THE PERFORMANCE AND EFFICIENCY OF A TWO-CYCLE INTERNAL COMBUSTION ENGINE

[75] Inventor: Eric D. Gorr, Arlington Heights, Ill.

[73] Assignee: Forward Motion, Inc., Elk Grove, Ill.

[21] Appl. No.: 533,135

[22] Filed: Sep. 16, 1983

[51] Int. Cl.³ .................. F02M 35/10; F02B 75/18
[52] U.S. Cl. ........................ 123/52 M; 123/52 MB; 123/52 MF; 123/73 R; 123/73 A
[58] Field of Search ............ 123/73 A, 73 R, 52 MB, 123/52 MF, 52 M

[56] References Cited

U.S. PATENT DOCUMENTS

| | | | |
|---|---|---|---|
| 1,804,321 | 5/1931 | Crowe | 123/52 M |
| 3,472,211 | 10/1969 | Meininger | 123/73 R |
| 3,810,454 | 5/1974 | Hunt | 123/52 MF |
| 3,990,414 | 11/1976 | Malphettes | 123/52 M |
| 4,231,329 | 11/1980 | Ishida | 123/52 M |
| 4,356,798 | 11/1982 | Sakaoka et al. | 123/52 M |
| 4,368,698 | 1/1983 | Matsuo et al. | 123/52 M |
| 4,389,982 | 6/1983 | Boyesen | 123/52 M |
| 4,402,297 | 9/1983 | Hyodo et al. | 123/52 M |
| 4,422,415 | 12/1983 | Matsuo et al. | 123/52 M |
| 4,423,706 | 1/1984 | Onodera | 123/52 M |

FOREIGN PATENT DOCUMENTS

| | | | |
|---|---|---|---|
| 721571 | 6/1942 | Fed. Rep. of Germany | 123/73 A |
| 1014383 | 8/1957 | Fed. Rep. of Germany | 123/73 A |
| 613399 | 12/1960 | Italy | 123/73 A |

Primary Examiner—Wendell E. Burns

[57] ABSTRACT

A method and apparatus for improving the performance and efficiency of a two-cycle internal combustion engine are described wherein the backflow combustion mixture gasses are captured at the reed valve and directed through a uni-directional passageway and injected back into the incoming air stream in the incoming air boot ahead of the carburetor so that the proper air-to-fuel mixture may be maintained by the carburetor. Recirculation of the backflow combustion mixture gasses as mentioned above increases the performance and the efficiency of a two-cycle internal combustion engine.

5 Claims, 3 Drawing Figures

U.S. Patent  Jul. 3, 1984  4,457,267
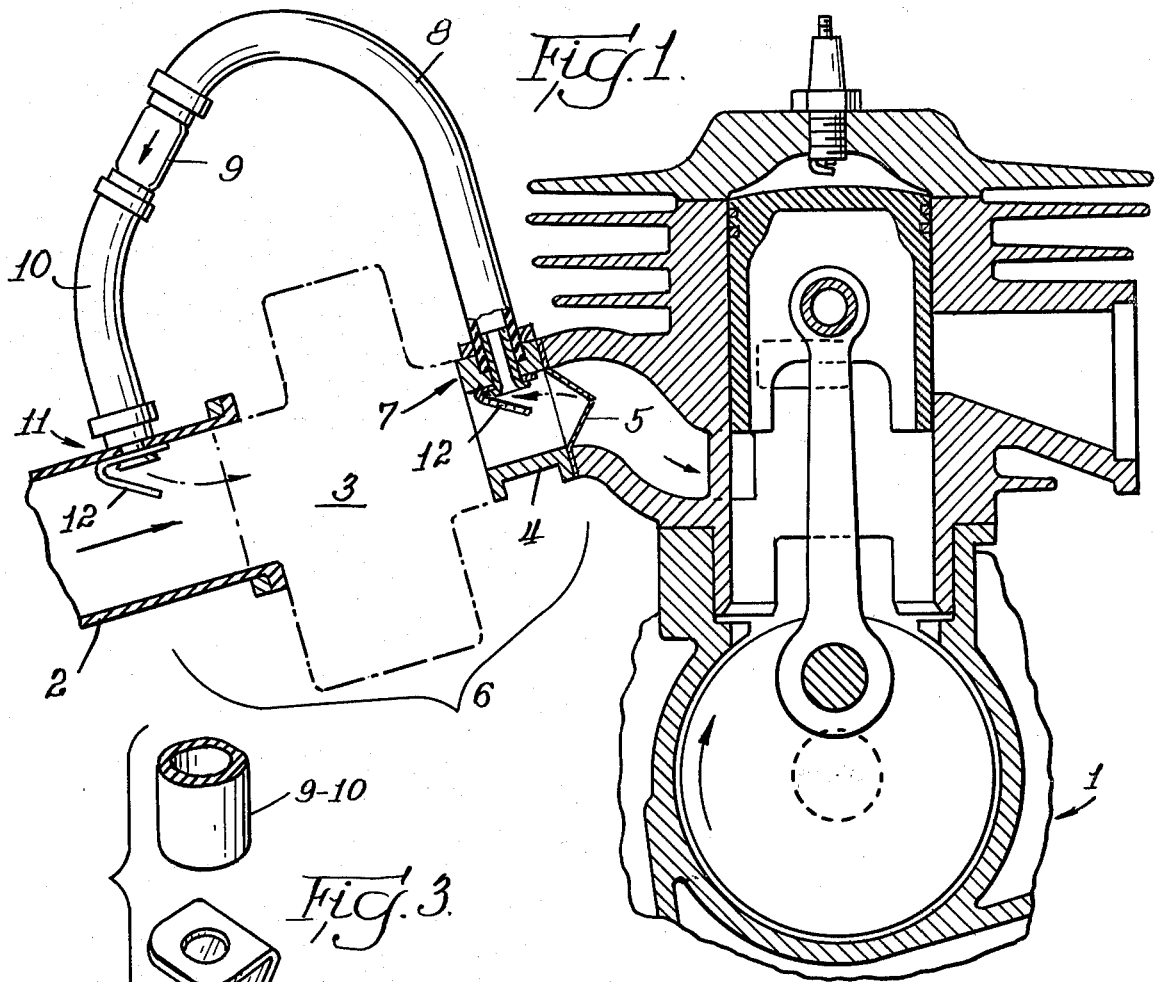
Fig. 1.
Fig. 3.
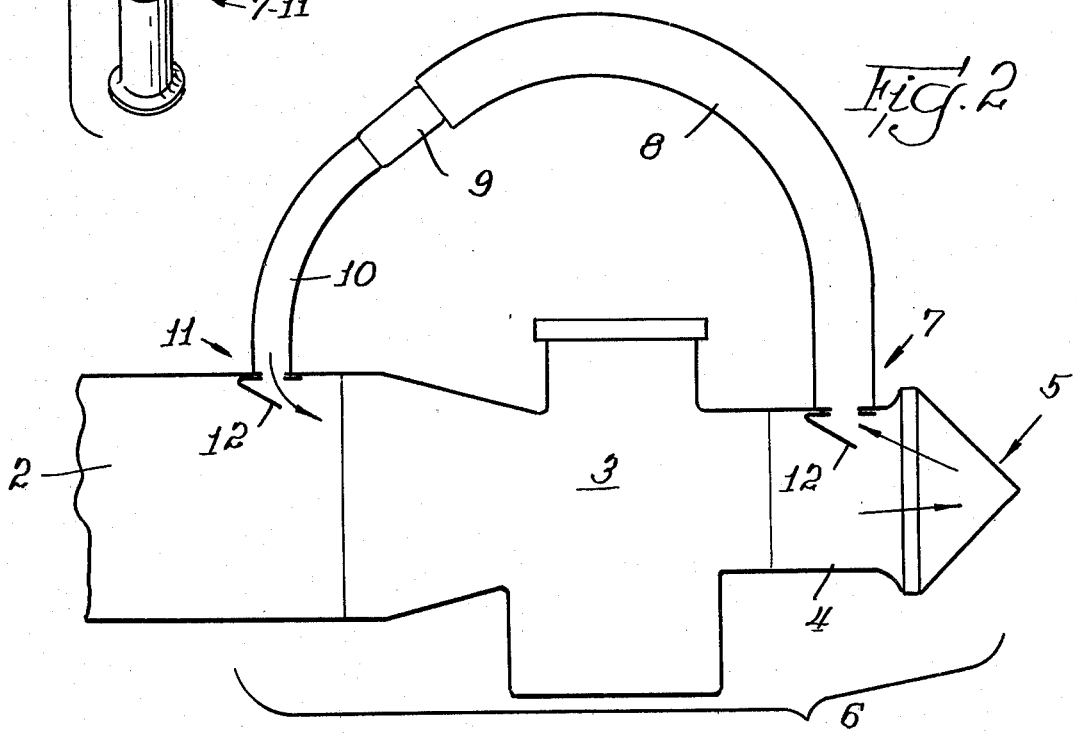
Fig. 2.

KINETIC ENERGY INJECTOR—METHOD AND APPARATUS FOR IMPROVING THE PERFORMANCE AND EFFICIENCY OF A TWO-CYCLE INTERNAL COMBUSTION ENGINE

BACKGROUND AND SUMMARY OF THE INVENTION

In a two-cycle internal combustion engine, as the piston moves upward from bottom-dead-center, the intake phase begins. Air travels through the air filter and the air intake boot and is mixed with fuel in the carburetor. The combustion mixture of air and fuel travels through the intake manifold and the reed valve, into the crankcase of the engine. When the piston moves downward from top-dead-center, it displaces the combustion mixture in the crankcase thus ending the intake phase and starting the combustion phase.

Due to the inertia of the incoming combustion mixture, which is still moving through the intake system when the reed valve closes at the end of the intake phase, a back pressure and reversal of flow of the combustion mixture causes a pressure rise at the carburetor. This rise in pressure at the carburetor results in a change to the mixing ratio of fuel-to-air producing a "rich" condition which causes a decrease in performance of the engine by causing a hesitation in acceleration (flat spot) which is very noticeable at low engine R.P.M. Additionally, the efficiency of the engine is also decreased because the ratio of fuel-to-air is too high, resulting in wasted fuel.

In the present state of the art, this undesirable back pressure and reversal of flow (backflow) is reduced by various inventions which incorporate some form of an auxillary chamber commonly referred to as a surge chamber or pressure chamber. This auxillary chamber is connected to the intake manifold between the carburetor and the reed valve and is used as a holding chamber to hold the backflow gasses until the reed valve opens and the next intake phase begins. This solution greatly reduces the back pressure at the carburetor, but it also significantly increases the volume of the intake manifold. This significant increase in volume of the intake manifold itself creates a detrimental effect on the engine's performance which is very noticeable at high engine R.P.M.

Accordingly, an object of the present invention is to improve the performance of a two-cycle internal combustion engine by eliminating or greatly reducing the undesirable backflow of combustion mixture through the intake system.

Another object of the present invention is to eliminate or greatly reduce this undesirable backflow of combustion mixture through the intake system without significantly increasing the volume of the intake manifold, as is common in the present state of the art inventions.

Still another object of the present invention is to increase the efficiency of a two-cycle internal combustion engine by reintroducing the backflow combustion mixture gasses back into the intake system ahead of the carburetor so that the gasses may be merged with the incoming air stream and remixed in the carburetor.

In the present invention, the objects mentioned above are accomplished by the insertion of a flow pickup into the intake manifold ahead of the reed valve which captures and directs the backflow combustion mixture gasses through a primary passageway, through a uni-directional control valve, through a secondary passageway, and through a flow injector, which reintroduces the backflow combustion mixture gasses back into the intake system ahead of the carburetor where the backflow gasses can merge with the incoming air stream entering the carburetor.

The length of this recirculation travel tube assembly is extremely critical to the engine performance and determines its frequency of operation. The frequency of operation of this invention must match the frequency of the engine's flat spot (hesitation in acceleration point). Each engine has a different frequency of operation and the present invention must be modified in length (tuned) to insure that its frequency of operation matches the frequency of operation of the engine.

When the present invention has been installed and tuned to match the engine's frequency, the length of time that the combustion mixture backflow gasses take to travel through the invention will be equal to the time it takes the piston to complete its combustion phase and begin a new intake phase. Thus the amount of backflow combustion mixture gasses present to interfere with the proper mixing of fuel-to-air by the carburetor is greatly reduced or eliminated completely. The result when the present invention is properly tuned to the engine's frequency is a smooth power transfer without any hesitation in acceleration (flat spot) at low engine R.P.M., and a more efficient performance.

BRIEF DESCRIPTION OF THE DRAWINGS

FIG. 1 is a section through a representative two-cycle internal combustion engine and its intake system with portions broken away and other portions shown diagramatically, illustrating a preferred embodiment of the present invention used therewith.

FIG. 2 is a diagramatic view of a preferred embodiment of the present invention showing how it is connected into the intake system arround the engine's carburetor.

FIG. 3 is an exploded isometric view of the flow pickup and flow injector assemblies illustrating their component parts.

DETAILED DESCRIPTION OF THE PREFERRED EMBODIMENT

The following disclosure is offered for public dissemination in return for the grant of a patent. Although it is detailed to insure adequacy and aid in understanding, this is not intended to prejudice that purpose of a patent which is to cover each new inventive concept therein, no matter how others may later disguise it by variations in form or additions or further improvements.

FIGS. 1 and 2 illustrate a two-cycle internal combustion engine comprising a multicomponent engine body, generally 1, and an intake system comprising a multicomponent assembly, generally 6, embodying the present invention.

The present invention comprises a multicomponent assembly having a flow pickup 7 which is connected to a primary passageway 8, which primary passageway 8 is also connected to a uni-directional control valve 9. Said uni-directional control valve 9 is also connected to a secondary passageway 10 which is in turn connected to a flow injector 11.

The flow pickup 7 has a directional scoop 12 which is inserted into the intake manifold 4 between the carburetor 3 and the reed valve 5. This directional scoop 12 is positioned in such a manner so as to capture the backflow combustion mixture gasses generated when the reed valve 5 closes at the end of the intake phase, and direct these backflow gasses through the primary passageway 8, the uni-directional control valve 9, the secondary passageway 10, and the flow injector 11, back into the intake air boot 2 where the backflow combustion mixture gasses can merge with the incoming air stream entering the carburetor 3. The flow injector 11 also has a directional scoop 12 to insure that the returning backflow gasses merge with the incoming air stream without creating an undesirable pressure differential entering the carburetor 3.

The uni-directional control valve 9 is incorporated into the present invention to prevent the captured backflow gasses from reversing direction, and to prevent the incoming air stream from reaching the reed valve 5 without first having been mixed with the correct amount of fuel in the carburetor 3.

The overall length of the present invention is very critical and determines the frequency of operation of the invention. For the present invention to generate optimal performance in the engine, the frequency of the invention must be matched with the frequency of the engine's flat spot. This is accomplished by adjusting the length (tuning) while monitoring the engine's performance until the engine's flat spot has been eliminated.

In summary, a method and apparatus has been described wherein the performance and efficiency of a two-cycle internal combustion engine has been greatly improved without creating an undesirable significantly increased volume in the intake manifold, as is common with current state of the art inventions. This method and apparatus basically recirculates the undesirable backflow combustion mixture gasses from the intake manifold 4, back into the air intake boot 2, ahead of the carburetor 3, to enable the proper mixture of fuel-to-air to be maintained by the carburetor 3 without wasting fuel.

I claim:

1. An apparatus adapted to be used in the intake system of an internal combustion engine, said apparatus comprising in combination:
   flow pickup means for capturing and directing of backflow combustion mixture gasses;
   primary passageway means for connection of flow pickup means with uni-directional means;
   uni-directional flow means connected to said primary passageway means and to a secondary passageway means to prevent flow of gasses other than from said primary passageway means to said secondary passageway means;
   secondary passageway means for connection of said uni-directional flow means with a flow injector means; and
   flow injector means for redirection of the captured backflow combustion mixture gasses back into the intake air boot, said apparatus forming a closed loop between said flow pickup means and flow injector means with no openings to or from atmosphere.

2. An apparatus according to claim 1, wherein said passageway means may be adjusted in length to vary the frequency of operation of the apparatus.

3. An apparatus according to claim 1, wherein said flow pickup means is inserted into the intake manifold ahead of the reed valve and positioned so that all backflow gasses will be captured by said flow pickup means.

4. An apparatus according to claim 1, wherein said flow injector means is inserted into the incoming air boot ahead of the carburetor and positioned so that the recirculated backflow gasses will merge with the incoming air stream entering the carburetor.

5. A method of improving the performance and efficiency of a two-cycle internal combustion engine, said method comprising the steps of:
   capturing backflow combustion mixture gasses at closed reed valve and directing gasses through a uni-directional passageway assembly back into incoming air boot ahead of the carburetor; and
   adjusting the length of the uni-directional passageway assembly so that the frequency matches the frequency of the engine to maximize performance and efficiency of the engine.

* * * * *